June 6, 1967  A. P. BRILL, JR  3,323,209
PRUNER
Filed April 16, 1965  2 Sheets-Sheet 1
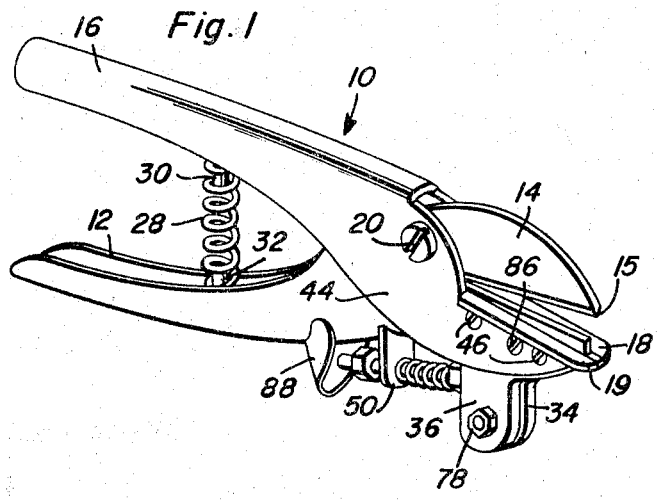
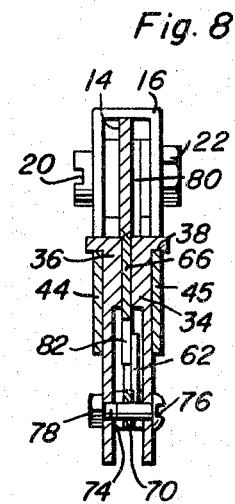
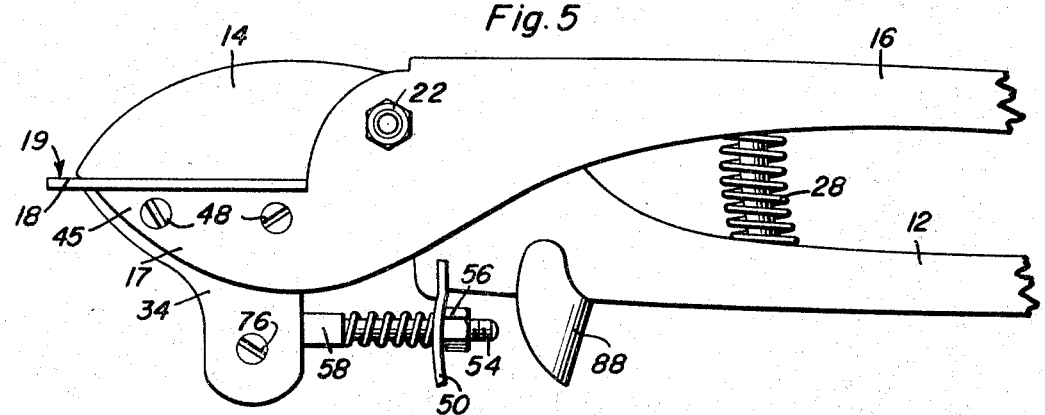
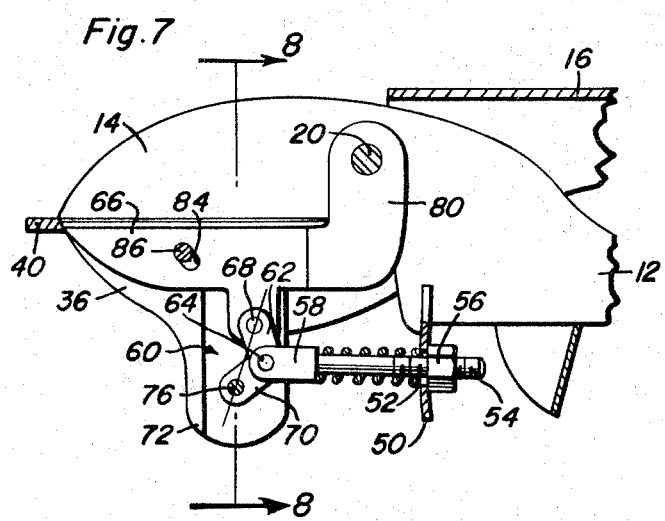
Alfred P. Brill, Jr.
INVENTOR.

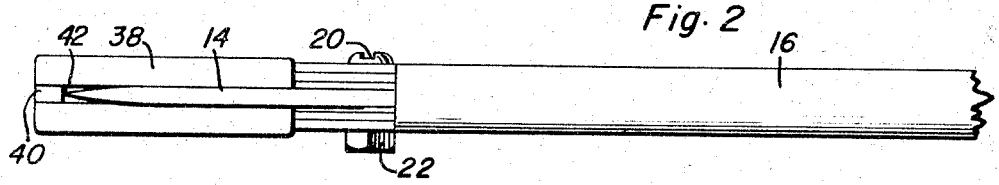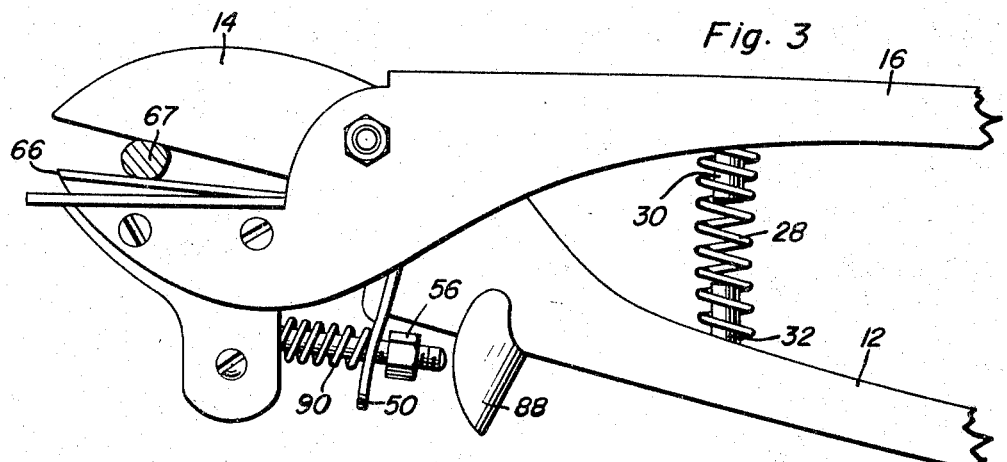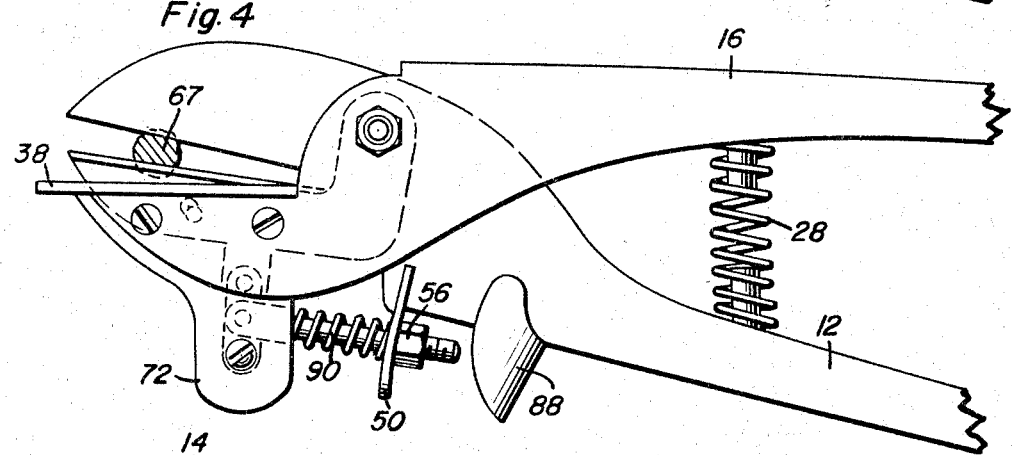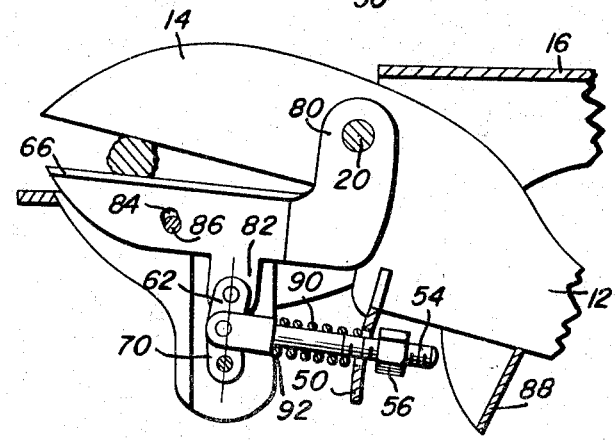

United States Patent Office 3,323,209
Patented June 6, 1967

3,323,209
PRUNER
Alfred P. Brill, Jr., De Land, Fla.
(P.O. Box 35, Canal Point, Fla. 33438)
Filed Apr. 16, 1965, Ser. No. 448,587
11 Claims. (Cl. 30—192)

This invention relates to pruning shears and has particular reference to the type of pruning shears using an anvil having a flat surface thereon together with an opposed movable blade for performing a cutting operation of limbs, twigs or the like.

A primary object of the present invention is to provide a pruning shear using an anvil having a flat face opposing a cutting blade on a first cutting element of the pruning shears, and providing blade means operatively associated with the flat surface of the anvil for providing a bottom cut to a limb, twig or the like which is to be severed by the pruning shears.

A still further object of the present invention is to provide a means on the pruning shears for retracting a cutting blade which provides a bottom cut to a limb, twig or the like into a slot provided in the flat surface of the anvil, when the pruning shears are operated in a limb cutting operation.

A still further object of the present invention is to provide pruning shears which provides a bottom cut to a limb, twig or the like in a pruning operation, which pruning shears is easy to manufacture, long lasting, dependable, economical in construction, simple in its operation and significantly effective for cutting limbs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the pruning shears of this invention;

FIGURE 2 is a plan view of the pruning shears of this invention with part of the handle being broken away;

FIGURE 3 is a side elevational view of the pruning shears showing the jaws in an open or non-cutting position;

FIGURE 4 is a side elevational view of the pruning shears showing the cooperating blades just prior to the retraction of the anvil blade in the cutting operation with the bottom notch already formed;

FIGURE 5 is a side elevational view of the pruning shears showing the shears closed after having performed a severing function;

FIGURE 6 is a longitudinal sectional view of the pruning shears showing the blades open;

FIGURE 7 is a sectional view of the pruning shears similar to FIGURE 6 but with the jaws closed in a cutting operation, and showing the action of the toggle link assembly to retract the anvil blade;

FIGURE 8 is a sectional view of the pruning shears taken along section line 8—8 of FIGURE 7 showing the operative mechanism therein for retracting the anvil blade.

Referring now more particularly to the drawings a pruning shears 10 is shown as comprising a handle 12 having a unitary offset cutting blade 14 at one end thereof and provided with a beveled edge 15, and a handle 16 having an offset unitary jaw 17 provided with an anvil 18 mounted at one end thereof and provided with a flat surface 19. The handles are pivotally interconnected by a pivot bolt 20 which is secured in position by a nut 22. The handles are formed biased in an open position by a coil spring 28 which is secured over a stud 30 on the handle 16 and over a stud 32 on the handle 12 which limit the inward movement of the handles.

The anvil 18 comprises two similar generally triangular plates 34 and 36. The plates each have a flat anvil plate 38 at the top thereof defining the flat surface 19. The plates 38 are soldered or welded together at the outer ends as at 40. The connection 40 is so designed as to leave a slot 42 between the flat plates 38 which slot is open at the end opposed to the weld or soldering connection 40. The anvil 18 is secured to jaw 17 formed by two plates 44 and 45 which are an extension of the handle 16 by screw bolts 46 on one side, and screw bolts 48 on the opposing side.

A contiguous projection 50 is secured to the bottom of the handle 12 and has an oval-shaped aperture 52 therein through which an operating rod 54 is telescopically received. The rod 54 is threaded at one end and has a nut 56 provided on the threaded end for engagement with the contiguous projection 50. The other end of the rod 54 has a U-shaped yoke 58 thereon pivotally connected to a toggle link assembly 60. The toggle link assembly comprises an upper link 62 pivotally connected to the yoke 58 by pivot pin 64 and pivotally connected to an anvil blade 66 by pivot pin 68. A lower link 70 of the toggle link assembly is pivotally connected by pin 64 to the yoke 58 and link 62. The lower end of link 70 is pivotally connected between depending projections 72 on the anvil plates 34 and 36 by a pivot bolt 76 and nut 78. A spacer sleeve 74 is disposed on bolt 76 to centralize link 70.

The anvil blade 66 has an extension 80 thereon which is pivotally connected to the pivot bolt 20 connecting the two handles. A depending ear 82 on the anvil blade 66 provides a means whereby the upper link 62 is pivotally connected by pin 68 to the anvil blade. The anvil blade 66 has an inclined slot 84 therein which receives a bolt 86 which extends through the jaw plates 44 and 45 and anvil plates 34 and 36.

A depending guard plate 88 is provided on the bottom surface of the handle 12 to limit the movement of the handle towards the rod 54. The rod 54 is normally biased to the position shown in FIGURE 6, wherein the anvil blade 66 is projected above the flat surface 19 of the anvil 18, by a coil spring 90 which abuts against the contiguous projection 50 on the handle 12 at one end, and against the yoke 58 at the other end. During the operation of the pruning device the coil spring 90 will abut against the shoulder 92 on the yoke 58.

In the operation of the pruning device of this invention the coil spring 28 will normally bias the handles 12 and 16 apart in the position shown in FIGURE 1 and blade 66 is oriented as illustrated in FIGURE 6. When the pruning device is to be used, a limb, twig or the like 67 is placed between the blades 14, and 66 as illustrated in FIGURES 3 and 6 whereafter the handles 12 and 16 are moved towards each other thus moving blades 14 and 66 toward each other. During this initial movement the blade 66 may move downwardly as the pin 64 moves forwardly. As soon as the projection 50 engages the nut 56, the pin 64 will be moved rearwardly toward a position with the links 62 and 70 in a straight line as shown in FIGURE 4. The rearward movement of pin 64 will prevent downward movement of the blade 66 and may even elevate the blade 66 slightly until links 62 and 70 pass rearwardly beyond the straight line condition of FIGURE 4 at which time the blade 66 will be retracted downwardly as pin 64 reaches its rearmost position as shown in FIGURE 7. The bolt 86 will limit the movement of the anvil blade 66 in its retracted, and in its projected position. When the handles are released the coil spring 28 under compression will open the handles to a ready position such as is illustrated in FIGURE 1. This operation will also permit the coil spring 90 acting against the contiguous projection 50 and against the shoulder 92 on the yoke 58 to force the rod 54 in a telescoping movement between the anvil plates 34 and 36 until the toggle link assembly 60 moves forwardly beyond a dead-center position such as is illustrated in FIGURE 6, wherein the anvil blade 66 will project above the flat surface 19 of the anvil 18. Also, the anvil blade 66 moving back up through the slot 42 will serve to clean the slot 42 of bark, cambium or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pruning cutter comprising, a pair of articulated shearing elements united by pivotal means, each of said shearing elements comprising a handle, a unitary blade forming a contiguous extension of a first of said handles, an anvil having a slot therein forming a contiguous extension of the second of the handles, said unitary blade and anvil moving toward and away from each other in a common plane by action of said handles, an anvil blade mounted in said anvil slot and pivotally attached to said unitary blade, said unitary blade passing into said slot in said anvil upon the movement of said handles to a complete cutting position, a toggle acting joint connected to said anvil blade and to said anvil the middle of said toggle joint having a rod secured thereto, a contiguous extension on the first handle, said contiguous extension reciprocably holding said rod, means on said rod for moving the rod and said toggle joint through a dead center position to a position wherein said anvil blade is retracted into said anvil slot by the first of said handles, and means on said rod for moving said anvil blade into a protruding position.

2. A pruning cutter comprising, a pair of articulated shearing elements united by pivotal means, each of said shearing elements forming jaws on one side of said pivotal means, and each comprising a handle on the opposite side of said pivotal means, the jaw on a first of said shearing elements including a blade integral with said handle, the jaw on the other shearing element comprising an anvil having a channel therein, and an anvil cutting blade mounted in said channel and pivotally secured to said first shearing element, and means securing said anvil cutting blade to said anvil and to the first of said shearing elements whereby said anvil cutting blade is retracted into said channel by a cutting action of the pruning cutter and for projecting said anvil blade from said anvil by a jaw opening movement of said handles.

3. A pruning cutter comprising a pair of articulated shearing elements united by pivotal means, each of said shearing elements comprising a handle, a blade forming a contiguous integral extension of one of said handles on a first of said elements, the second of said handles having an anvil with a flat surface facing said blade on an extension thereof, said anvil and blade being in cooperative shearing relationship, an anvil blade cooperating with said anvil, said anvil blade being pivotally connected to the first of said elements and being connected to said anvil by a toggle link assembly, means normally holding said anvil blade in a projected position above the flat surface of said anvil, and means connected to the first of said elements and to said toggle link assembly for retracting said anvil blade below said flat surface on said anvil upon a shearing action of said handles.

4. A pruning cutter comprising a pair of articulated shearing elements united by pivotal means, each of said elements being provided with cutting blades and operating handles, an anvil plate carried by one of said shearing elements, said anvil plate having a channel therein, one of said cutting blades being mounted in said channel and being pivotally connected to the other of said shearing elements, and means connecting said one of said cutting blades to said anvil and to the other of said elements for movement in respect to said anvil plate upon operation of said handles.

5. A pruning cutter comprising, a pair of articulated cutting elements united by pivotal means, a unitary blade and first handle comprising a first of said cutting elements, an anvil and a second handle comprising a second of said cutting elements, said anvil having a slot therein, said unitary blade and said anvil cooperating in a scissors movement upon operation of said handles, and an anvil blade pivotally secured to the first of said cutting elements and being retained in said slot in said anvil and opposing the unitary blade.

6. The pruning cutter of claim 5 wherein said anvil includes a flat surface opposing said unitary blade, said surface serving as a platform to cut off limbs, twigs, or the like upon a closing scissors movement of the unitary blade, said anvil slot serving as a guide for the anvil blade to retain the anvil blade in alignment with the unitary blade, and means securing said anvil blade to said anvil and to the first of said cutting elements whereby the anvil blade is retracted into said slot upon cutting operation of said handles and for projecting said anvil blade beyond said flat surface toward said unitary blade upon a blade opening operation of said handles.

7. The pruning cutter of claim 6 wherein said means securing said anvil blade comprises a toggle link assembly having two legs, one leg being connected to said anvil blade and a second leg connected to said anvil, said legs being connected together by a pivotal means, said first cutting element having a contiguous extension thereon, and said means including a rod connected to said toggle link assembly at said pivotal means and telescopically carried by said contiguous extension.

8. The pruning cutter of claim 7 wherein said rod has means thereon for urging said toggle link assembly to a position wherein said anvil blade projects beyond said flat surface when said handles are open, and means on said rod for moving said toggle link assembly to a position retracting said anvil blade when said handles are closed.

9. The pruning cutter of claim 8 wherein said means are adapted to hold said anvil blade in a projected position until said unitary blade is moved to a position adjacent thereto thereby beginning a bottom cut on a limb, twig, or the like through pressure exerted by the upper blade forcing the limb, twig, or the like downward with great pressure on the anvil blade.

10. The pruning cutter of claim 9 wherein compression spring means are secured between said handles to normally bias said handles in an open position.

11. A pruning cutter comprising a pair of articulated shearing elements united by pivotal means, each of said shearing elements comprising a handle, a unitary blade carried by a first of said shearing elements, and an anvil having a flat surface carried by a second of said shearing elements, cutting means on said pruning cutter operatively associated with said anvil to provide a bottom cut to limbs, twigs, or the like when said handles are operated to a compressed position, and means connected to said cutting means and to one of said handles for retracting said cutting means below said flat surface of said anvil when said handles are compressed.

References Cited

UNITED STATES PATENTS

| | | | |
|---|---|---|---|
| 1,775,086 | 9/1930 | Bonehill | 30—134 |
| 2,064,105 | 12/1936 | Conlee | 30—134 |
| 3,237,303 | 3/1966 | Fennell | 30—135 |

WILLIAM FELDMAN, *Primary Examiner.*

J. C. PETERS, *Assistant Examiner.*